United States Patent [19]
Sciaky

[11] 3,937,916
[45] Feb. 10, 1976

[54] ROTATING ARC WELDING METHOD AND APPARATUS

[75] Inventor: David Sciaky, Chicago, Ill.

[73] Assignee: Welding Research, Inc., Chicago, Ill.

[22] Filed: July 22, 1974

[21] Appl. No.: 490,306

[52] U.S. Cl................. 219/104; 219/60 R; 219/61; 219/97; 219/101; 219/123

[51] Int. Cl.²........................................ B23K 9/08

[58] Field of Search............ 219/60 A, 60 R, 61, 97, 219/100, 101, 104, 123

[56] References Cited
UNITED STATES PATENTS

| | | |
|---|---|---|
| 2,286,210 | 6/1942 | Klemperer et al..................... 219/97 |
| 2,472,851 | 6/1949 | Landis et al...................... 219/123 X |
| 2,477,582 | 8/1949 | Dawson................................. 219/97 |
| 3,244,931 | 4/1966 | Le Vantine et al............. 219/123 X |
| 3,287,539 | 11/1966 | Stevens........................... 219/123 X |
| 3,484,578 | 12/1969 | Sciaky............................. 219/123 X |

Primary Examiner—J. V. Truhe
Assistant Examiner—N. D. Herkamp

[57] ABSTRACT

Apparatus for welding parts, such as pipes, end to end by means of an electric arc which is caused to rotate along the adjacent edges of the pipes. Two separate magnetic fields are used to cause the arc to follow a spiral path along the edges so that pipes having a wall thickness greater than one quarter of an inch may be welded.

7 Claims, 14 Drawing Figures

ROTATING ARC WELDING METHOD AND APPARATUS

This invention relates to a welding method and apparatus and, more specifically, to a method of welding by means of an electric arc which is propelled by magnetic means along a desired path along which a weld is to be effected. In previous methods of welding by means of a rotating arc, such as, for example, that described in U.S. Pat. No. 3,484,578 of Dec. 16, 1969, the arc between the ends of two pipes to be welded is caused to rotate along the circular path defined by the ends of the pipe by the introduction of a magnetic field which moves radially through the gap between the ends of the pipes. The reaction between the magnetic field created around the arc due to current passing between the ends of the two pipes and the radial magnetic field causes the arc to move in a circular path.

Attempts have been made to weld pipes utilizing direct current sources for both the solenoids supplying the radial magnetic field and the supply for the high arc current but the welds produced with these power sources proved to be defective in two respects. One, a crater formed along the edge of one of the parts with the lost metal being deposited on the end of the second part. The build up of metal occurred on the end of the pipe connected to the positive terminal of the high power arc welding current source. Two, it was also found that the end of the pipe connected to the negative or cathode terminal of the arc power supply was raised to a temperature much higher than that reached by the pipe connected to the positive terminal. In order to obtain the desired temperature at the end of the pipe connected to the positive terminal it was necessary to increase the arc current. This increase caused an excessive heating of the pipe connected to the cathode terminal resulting in an excessive annealing of the pipe and an inability to forge the material properly after welding because of the amount of material that had become plastic. The increased heating also caused an excessive amount of material at the edges of the pipe to become de-carburized so that after upset an excessive amount of de-carbonized steel was present in the joint. This produced a weld area having a lower tensile strength than the parent metal and a reduced hardness. In addition to the above deficiencies and inconveniences, it was also found that there was a limitation in the wall thickness of pipes that could be welded by the rotating arc process. This is due to the fact that the arc has a limited cross-sectional area, the diameter of the spot being limited to a maximum of approximately ¼in. to 5/16in., depending upon the current being utilized. When attempting to weld pipes having wall thicknesses greater than ¼in. it is found that the arc is struck over a band on the inner edge of the pipes which is limited to the arc spot size so that incomplete heating of the edge surfaces results. Because of this there is incomplete fusion of the edges of the pipes being welded with extremely low joint efficiency of the weld.

The present invention has as its object the production of welds by a rotating arc which do not suffer from the above described deficiencies.

It is an object of the present invention to provide a system of welding by means of the rotating arc which can be used for welding pipe having wall thicknesses in excess of the diameter of the arc spot.

Another object of this invention is to provide a method whereby both pipe ends to be joined are heated to the same degree by means of a rotating arc.

It is a further object of this invention to provide a method and apparatus whereby a minimum of decarburization of the material in the weld area is effected.

It is a further object of this invention to provide a method whereby welds of high joint efficiency may be realized.

In order to better describe the invention reference is made to the illustrations which are a part of the specification.

Figure 1:
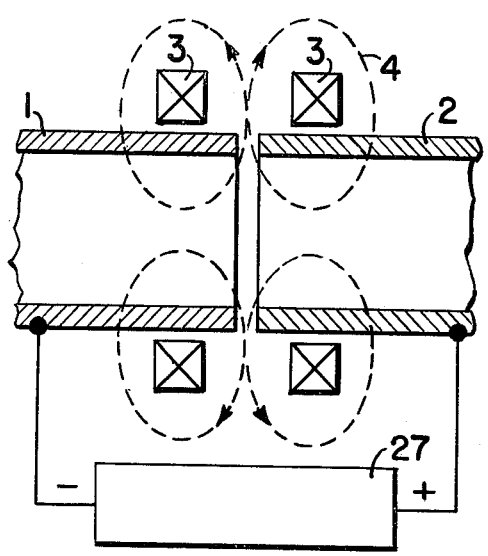
FIG. 1 is a schematic illustration in partial cross-section of the previous method utilized in producing a rotating arc.

Referring now to FIG. 1 which is a schematic representation in section of some of the elements in the old rotating arc equipment, 1 and 2 are pipes which are to be welded between their adjacent edges, 3 represents two separate solenoid coils placed outside of the pipes 1 and 2 and through which direct current is passed so as to generate a magnetic field 4 which passes radially through the gap between the two pipes. The pipes 1 and 2 are connected respectively to the negative and positive terminals of a DC arc welding power supply (27). The arc between the two pipe ends may be struck by passing a high frequency spark across the adjacent edges of the pipes. A high current direct current arc will then be struck between the pipe edges, and the magnetic field generated by the arc will react with the radial magnetic field generated by the solenoid coils 3 and cause the arc to move in a circular path along the edges of the pipes which are held in the clamps provided on the welding machine. As the arc rotates the edges of the two pipes are heated by the high temperature arc and the temperature of the edges is allowed to increase until they reach the welding temperature at which time the edges are squeezed together with a high forging force generated by a hydraulic or pneumatic jack. In order to overcome the formation of scallops along the edges of the pipes or the transfer of metal from one pipe to the other or the overheating of one pipe edge as compared to the second pipe edge, the arc current may be supplied by an alternating current arc power supply. When this is utilized the direction of rotation of the rotating arc will change with the change in direction of the current across the arc. The arc then may make several revolutions in one direction during one-half cycle of the alternating current source and several revolutions in the opposite direction during the following half cycle of arc welding current.

Figure 2:
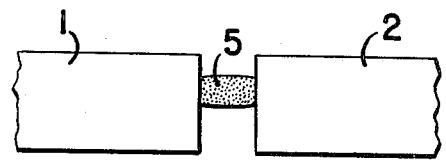
FIG. 2 is a cross-section of a thick walled pipe showing the formation of the arc between the pipe ends.

This latter method is effective and useful in the welding of thin wall tubing having relatively small diameter. For example a two or three inch diameter tubing having a wall thickness no greater than ¼inch. If an attempt is made to weld pipes having a wall thickness greater than ¼inch the action will be illustrated in FIG. 2 where it is shown that the arc 5 will form between the ends of the pipe 1 and 2 over a limited portion of the wall thickness of the pipes making it impossible to weld these thicker walled pipes by the old rotating arc method.

Figure 3:
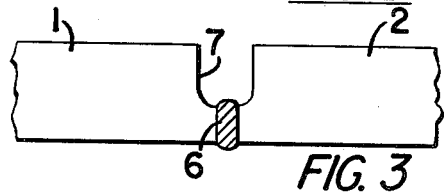
FIG. 3 illustrates in cross-section one form of edge preparation for the ends of thick walled pipes to be welded.
Figure 4:
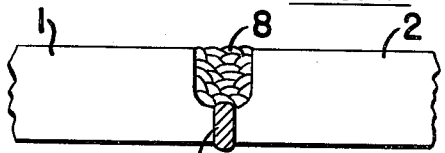
FIG. 4 illustrates in cross-section the ends of the pipe after welding.

A compromise method of welding pipes of thicker walls may be utilized by preparing the ends of the pipes to be welded together with a machining operation which forms a J-groove at the ends of the pipes, as illustrated in FIG. 3 at 7, leaving a section of pipe at the bottom of the groove where the edges of the two pipes when placed adjacent to each other will be parallel to each other over a thickness of approximately ¼inch. This section of the pipe may then be welded by the rotating arc method so as to form a root weld as indicated at 6 after which the two pipes now held together by the weld 6 may have the weld completed by filling the groove formed between the two edges through the use of the metal inert gas welding process or any other suitable welding process by which metal may be deposited in the groove. FIG. 4 illustrates the completed joining of the two pipes 1 and 2 by the weld formed with the rotating arc process at 6 and the filler metal deposited at 8.

Figure 5:
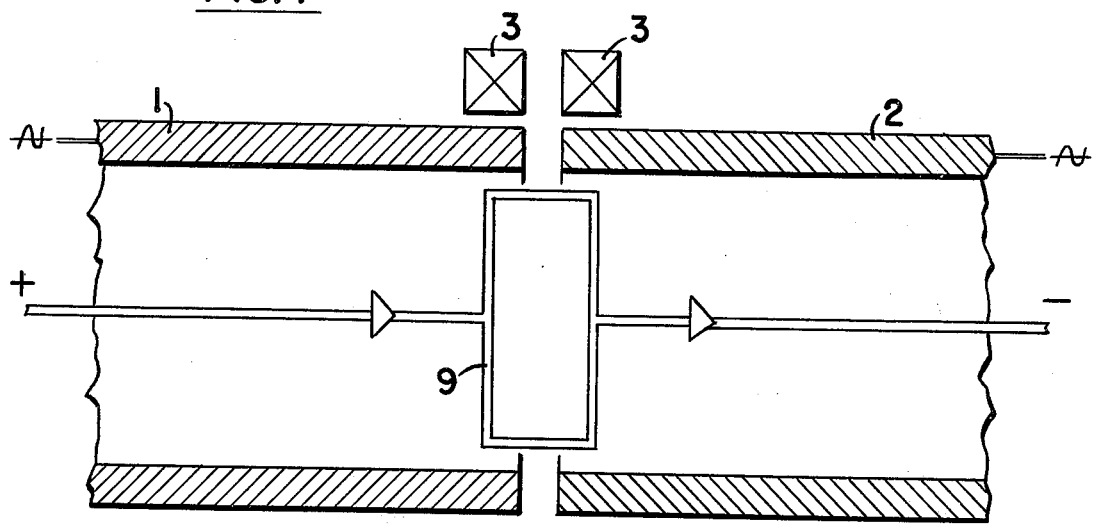
FIG. 5 illustrates in partial symbolic cross-section the elements of a rotating arc welding machine for practicing the method of the present invention.
Figure 6:
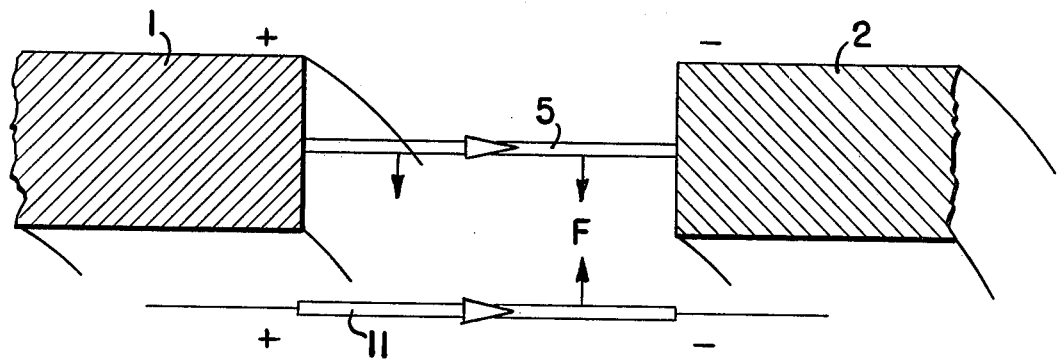
FIGS. 6 and 7 are details illustrating some of the forces acting upon the rotating arc.
Figure 7:
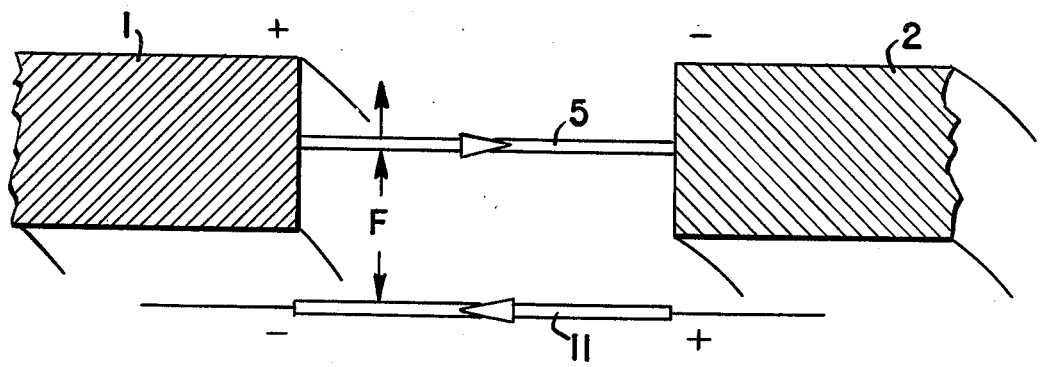

In order to produce a weld between pipes of wall thicknesses greater than ¼inch completely through the use of the rotating arc and without resorting to J-groove end preparation or filler metal, the novel method illustrated in FIG. 5 may be utilized. 1 and 2 represent thick walled pipes to be welded. 3 represents the solenoids or permanent magnets which create the radial magnetic field to cause rotation of the arc. In addition to this a hollow electrical conducting drum made from a non-magnetic material preferable is utilized inside the pipes to be welded and positioned so that it is centered within the pipes at the gap between the pipes. A direct current power source supplies a uni-directional current which passes in the direction shown by the arrows through the drum 9. The magnetic field generated by the current passing through the portion of the drum in closest proximity to the pipes being welded reacts with the magnetic field around the rotating arc and causes the arc to move outwardly or inwardly depending upon the direction of current flow in the drum with respect to the direction of current flow in the arc. FIGS. 6 and 7 illustrate schematically the action that results from the effect of these magnetic fields. In FIG. 6 the arc and the direction of current flow through the arc between the edges of the pipes 1 and 2 is indicated at 5. A segment of the drum running parallel to the axis of the pipes is indicated at 11, the arrow showing the direction of current flow through the segment. Because of the current flowing through the arc and through the segment a force will be generated between the arc and the segment, inasmuch as the currents are flowing in the same direction, that will act in such a direction as to bring the arc and the segments together. Since the segment is fixed in place on the drum, the arc will move inward towards the segment along a spiral path resulting from the circumferential and radial forces acting upon the arc. FIG. 7 illustrates schematically the forces existing between the segment 11 and the arc 5 when the currents are in opposite directions. In this case the force is in such a direction as to cause a separation between the two so that the arc moves outwardly.

Figure 8:
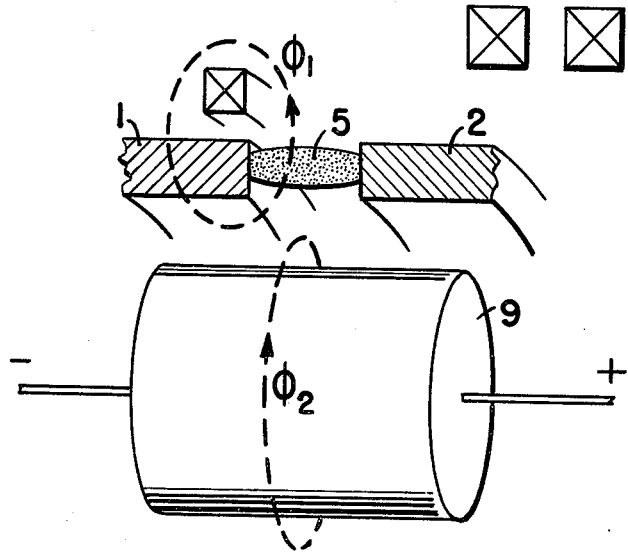
FIG. 8 is an illustration in partial symbolic cross-sectional perspective which illustrates the relationship between the magnetic fields causing the arc motion.
Figure 9:
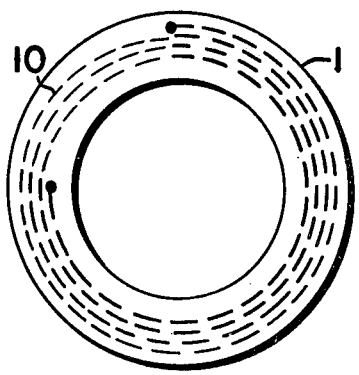
FIG. 9 illustrates the path taken by the arc during the welding operation.
Figure 5A:
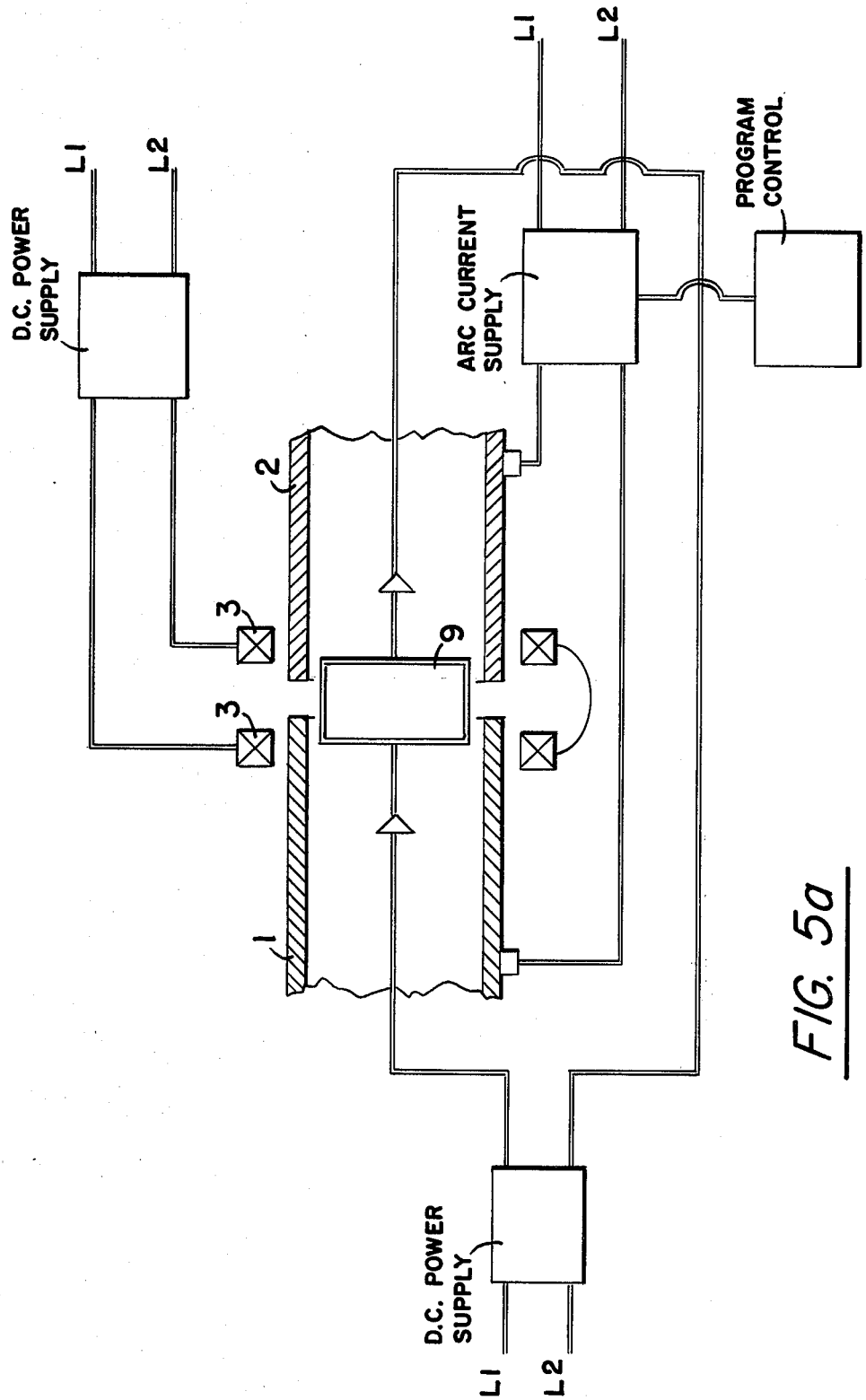
FIG. 5A illustrates schematically the relationship of the power supply and control elements to the invention.

FIG. 8 is a schematic illustration in perspective which shows the various fields and currents which act upon the arc. The current passing through the drum, indicated by the arrows, causes a flux $O_2$ concentric to the pipes 1 and 2 to form in the gap and react with the magnetic field around the arc so as to cause a spiral motion of the arc as indicated in FIG. 9 by the dotted spiral line 10. It has been discovered when utilizing a low frequency alternating current power supply for the arc current, that after the arc is struck between the edges of the pipes to be welded it will progressively spiral out towards the outer edge and when the polarity of the current reverses itself the arc will spiral inwardly and so continue spiraling alternately inwardly and outwardly until the temperature of the two surfaces are brought to the proper level for fusion.

Figure 10:
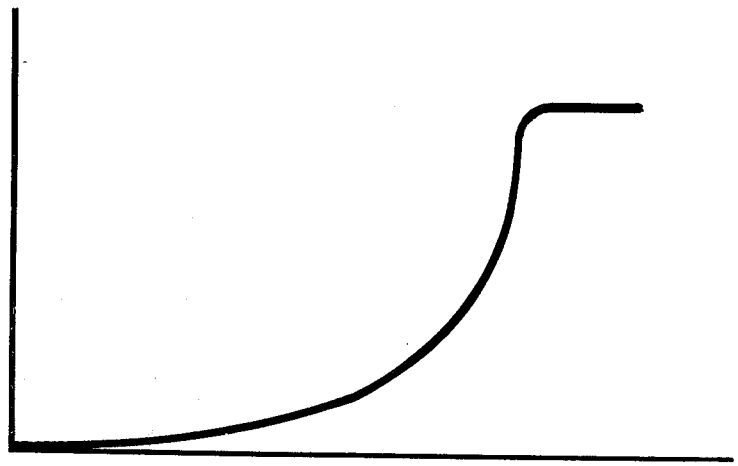
FIG. 10 is a graph showing the relationship of arc current with respect to time.

It has also been discovered that programming the arc current with respect to time as illustrated by the graph of FIG. 10 is useful in order to produce a weld having a minimum of decarburization, a minimum of upset, and a maximum strength.

Referring to the graph, we may note that the arc current is initiated at a low level and increases at a low rate so as to allow the end surfaces of the pipes to be welded to be conditioned and brought up in temperature. During this first portion of the welding program the temperature at the end of the pipe is held below the temperature at which rapid decarburization will result. Towards the end of the welding program the current is increased at a rapidly accelerated rate and quickly brought to the proper fusion temperature where it is maintained for a short period (the plateau at the end of the program). The current is then terminated simultaneously with the application of the forging force and the weld thus completed.

Using this procedure only a thin layer of material at the edges of the parts reaches the liquid state and is allowed to remain in the liquid state for only a very short period of time prior to being squeezed out during the upsetting of the material. Because of this only the very minimum of material at the interface loses carbon content with very little of the material behind the liquid face reaching the plastic range so that very little material is upset. Because the described arc current program brings only a limited volume of metal into the plastic stage the solid metal base beside this thin plastic zone allows for a more effective transmission of the forging force to the weld. The arc current program may easily be realized by the use of a motor operated variable transformer feeding the arc power supply or through the use of a saturable-reactor controlled by a suitable programmable controller.

Figure 11:
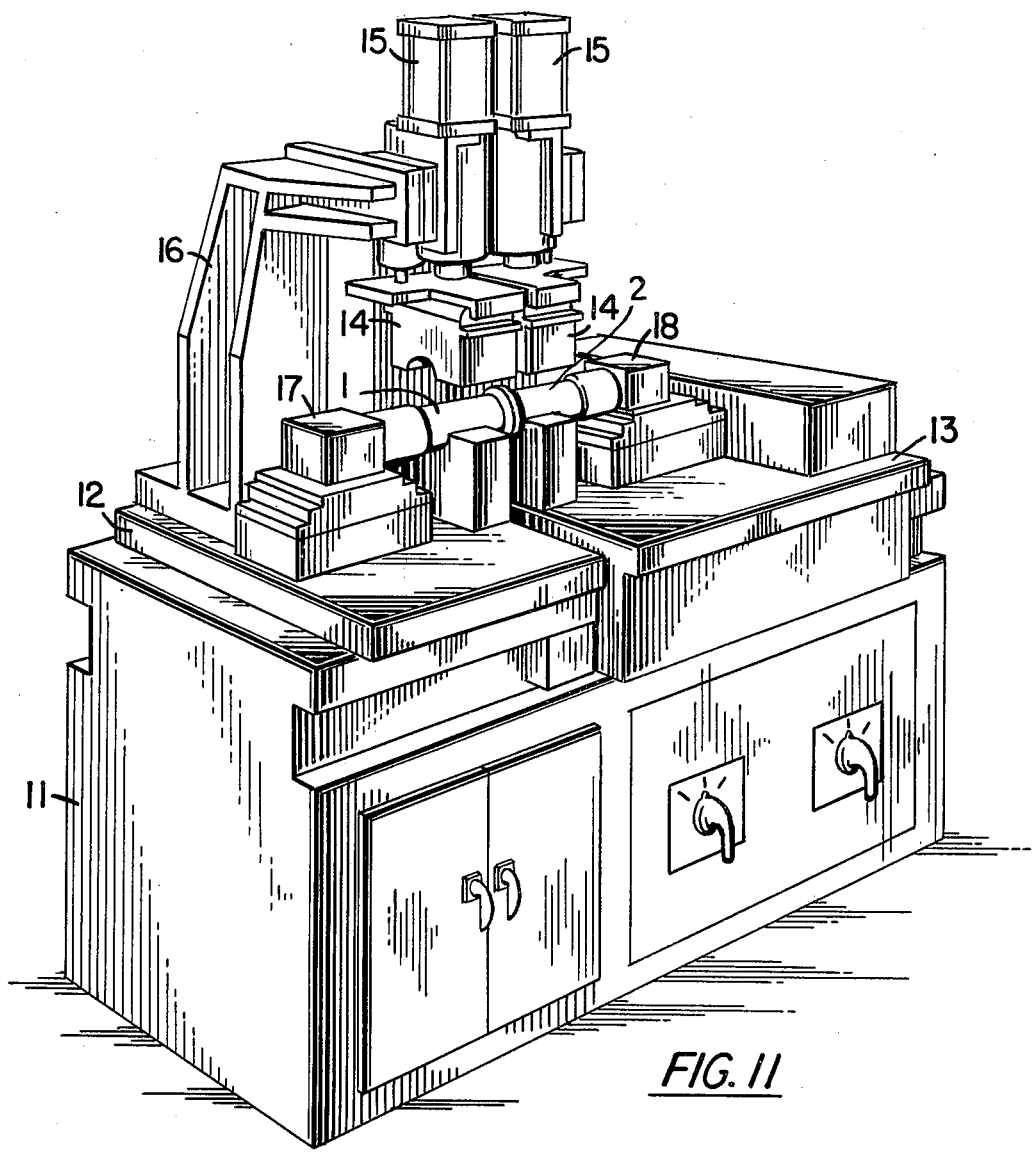
FIG. 11 is a drawing in perspective of a machine for practicing the invention.

A typical machine for use in practicing the process of the present invention is illustrated in FIG. 11. The frame of the machine is in the form of a table upon which is mounted a fixed plate 12 and a movable carriage 13 which carry clamping devices 14 which are operated by hydraulic or pneumatic pressure operators 15 which are supported by two similar structures 16, one mounted on the fixed table and the other mounted on the movable carriage. When the hydraulic or pneumatic cylinders 15 are energized the clamps 14 will move downward to engage the two sections of pipe 1 and 2 which are to be welded. A rigid back bar 17 is provided at the left and stationary portion of the machine so that when the table 13 is caused to move to the left during the forging period the force applied to the right-hand pipe by the block 18 which is attached to the moving carriage is taken up by the reaction of the fixed block 17. The permanent magnets or the electromagnets which provide the field for rotating the arc are held within the clamps 14 and the current from the arc current supply is fed to the piece parts by connections made to the fixed table and to the moving carriage which is insulated from the frame and the stationary plate. The cylinder through which current is passed for producing the magnetic field which causes the arc to move outwardly during the welding operation is supported by the backup block 17 by a conducting member which is insulated from and fastened to 17. A similar conductor at the opposite end of the cylinder bears against a spring loaded contact terminal which brings current from a DC power supply through the terminal to the conducting rod through the cylinder and through the first mentioned conducting rod returning then to the power supply. By this means current is provided for the production of the field which is concentric with the axis of the tubing and the block 18 carried on the carriage 13 is free to move without damaging the conductor inside the pipe.

Figure 12A:
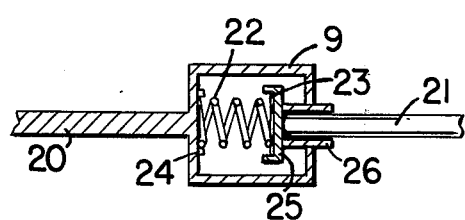
FIGS. 12a and 12b are sectional views showing means for supporting and bringing current to one of the elements of the invention.
Figure 12B:
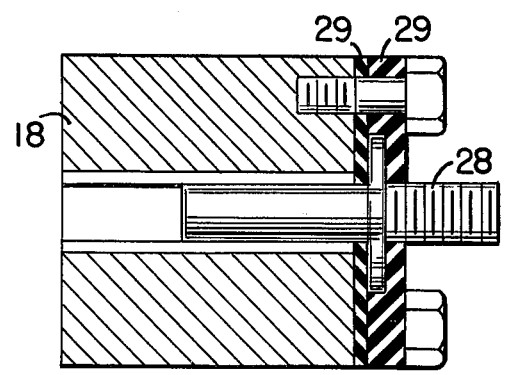

Another means for supporting the cylinder while allowing for motion of the carriage is illustrated in FIG. 12a. The hollow copper cylinder 9 is supported by conductor rod 20 which is fastened to backup block 17 which is grounded to the frame of the machine. Conducting rod 21 which is free to slide in conductive sleeve bearing 26 is pushed towards the right by spring 22 which is retained by spring retainers 24 and 25. Electrical insulation 23 prevents current from passing through the spring. When the carriage is moved to the extreme right the parts to be welded may be slipped over the cylinder and clamped in position by the clamps 14. The slide is then brought to the left and when the parts to be welded approach each other close to the welding position the end of conducting rod 21 makes contact with the terminal 28 shown in FIG. 12b which is mounted upon but insulated by insulators 29 from right hand backup bar 18. A suitable power supply whose output is controllable is connected between this terminal 28 and the frame of the machine so that current may be passed from the power supply through the hollow cylinder so as to generate the magnetic field which will cause the arc to move outwardly and inwardly as it rotates between the edges of the parts being welded. During the upset period when the two parts are brought together by the motion of the carriage to the left the conducting rod 21 will slide within the sleeve bearing so that the forging force may be applied without restriction to the parts being welded.

The various features and advantages of the invention are thought to be clear from the foregoing description. Various other features and advantages not specifically mentioned will undoubtedly occur to those versed in the art, as well as modifications of the embodiment illustrated, all of which may be achieved without departing from the spirit and scope of the invention as defined in the following claims. What I claim is:

1. An apparatus for welding two parts along their adjacent edges by means of a magnetically propelled electric arc comprising;
    means for supporting the two parts to be welded so that their adjacent edges are separated by a gap,
    means for causing an electric arc to be produced across the said gap,
    a first means for generating a magnetic field between the said edges which causes the arc to move along them;
    a second means for generating a second magnetic field between and flowing parallel to the said edges which will cause the said arc to be urged in a radial direction while being propelled by the said first magnetic field,
    means for controlling the arc current and means for controlling the second said means for generating magnetic fields; and,
    means for pressing the said parts together.

2. An apparataus as in claim 1 in which the said means for causing an electric arc is an alternating current power supply.

3. An apparatus as in claim 1 in which the said first means for generating a magnetic field is a permanent magnet.

4. An apparatus as in claim 1 in which the said means for generating a second magnetic field includes a hollow electrical conducting cylinder of non-magnetic material supported concentrically and adjacent to the pipes being welded.

5. An apparatus as in claim 1 including means for controlling the arc current so that the arc current rises slowly during the initial portion of the welding period until the edges reach a predetermined temperature after which the current is caused to increase rapidly until a thin layer of molten material is formed at the adjacent edges of the said parts.

6. An apparatus as in claim 1 including means for upsetting the welded area.

7. A method for welding two parts along their adjacent edges comprising the steps of;
    clamping the two parts to be welded so that their adjacent edges are separated by a gap;
    causing an electric arc to be produced across the said gap;
    generating a radial magnetic field between the said edges for causing the arc to move along said edges;
    generating a second magnetic field concentric to said parts between the said edges to cause the said arc to be urged in a radial direction while being propelled by the first mentioned magnetic field so that the arc describes a spiral motion;
    controlling the arc current so that it follows a predetermined program of arc current with respect to time; and,
    pressing the said parts together at the said edges.

* * * * *